United States Patent Office 3,393,847
Patented July 23, 1968

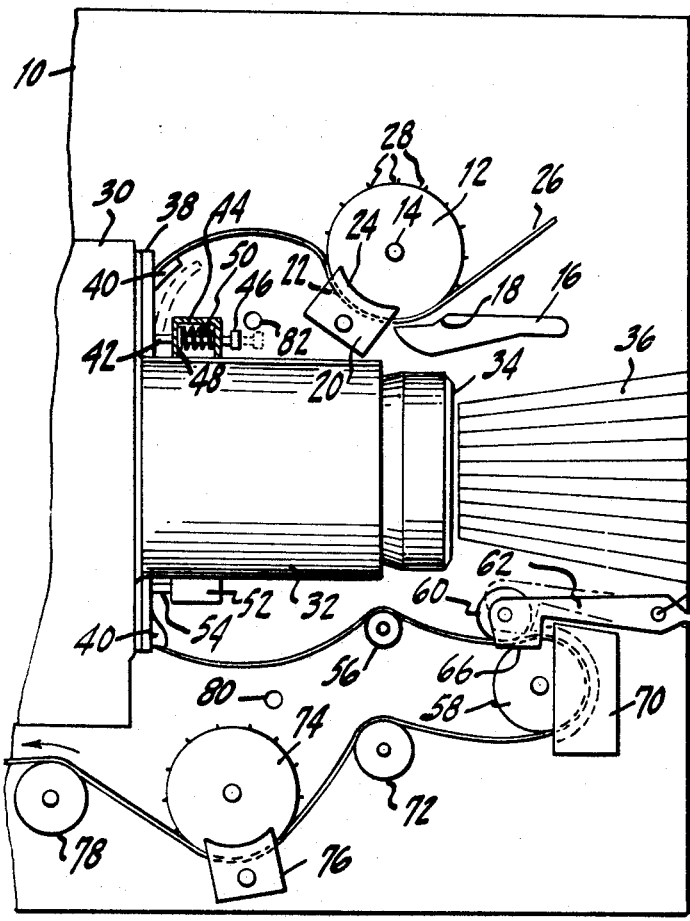
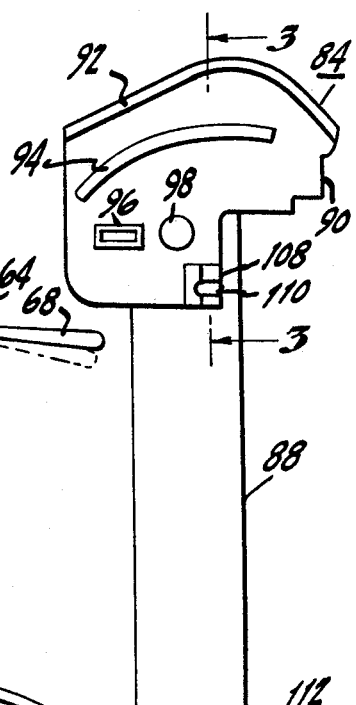
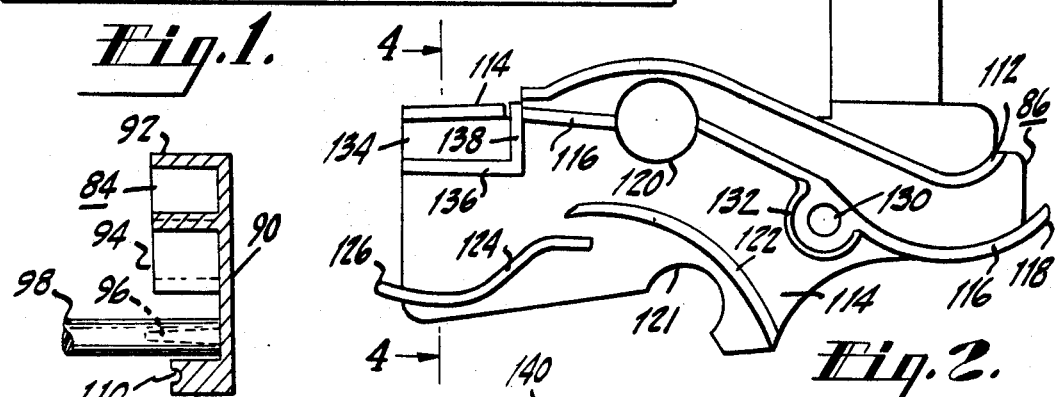
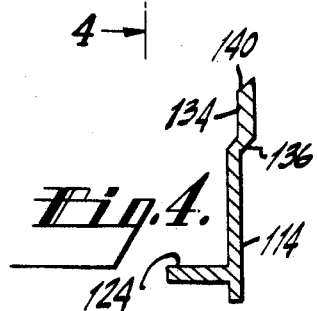
Fig.1.
Fig.2.
Fig.3.
Fig.4.
INVENTORS
JAMES L. YOUNG &
RONALD A. LICHALK
BY Edward J Norton
Attorney

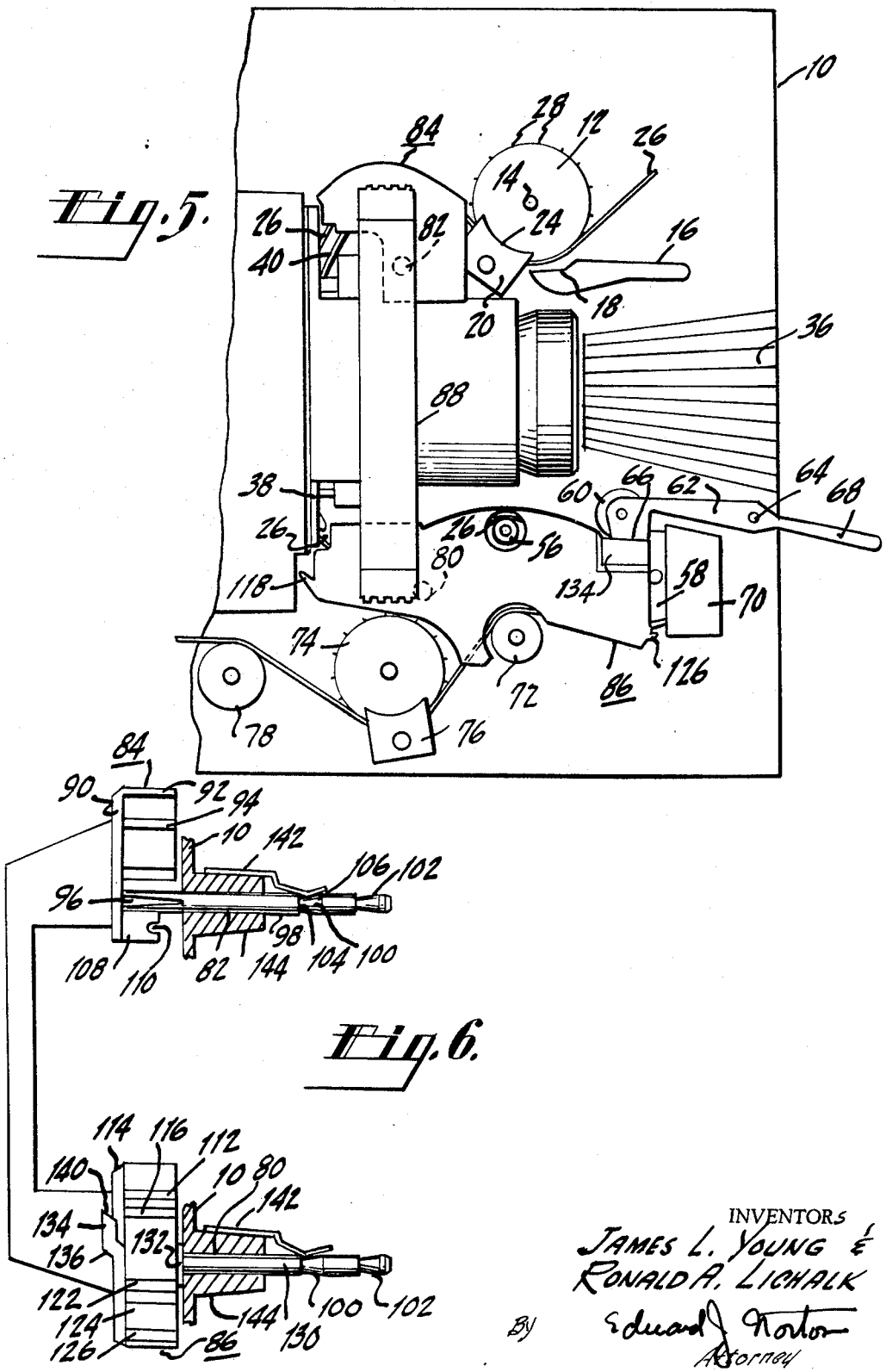

3,393,847
FILM THREADING ARRANGEMENT
James L. Young, McMurray, and Ronald A. Lichalk, Pittsburgh, Pa., assignors to Radio Corporation of America, a corporation of Delaware
Filed May 18, 1966, Ser. No. 551,142
10 Claims. (Cl. 226—89)

ABSTRACT OF THE DISCLOSURE

A film threading device for a talking motion picture projector which is moveable between two positions with respect to the projector. In one position of the threading device, it guides the film during the threading operation, opening the film gate and separating the sound pressure roller from the sound drum to facilitate threading. In the other position of the threading device, it is held away from the film in a stored position.

---

This invention relates to an improved film threading device which operates in combination with an apparatus for scanning film to reproduce either pictures or sounds, or both, that are recorded on the film.

It is necessary, when preparing to operate a film scanning apparatus, to thread the film from the supply reel through various portions of the apparatus. When the apparatus is a sound motion picture projector, the film must be threaded from the supply reel, between the upper sprocket wheel and its shoe, through the film gate, between the sound drum and its pressure roller and between the lower sprocket wheel and its pressure shoe to the take-up reel. This threading operation takes time, a certain amount of skill and may involve damage to the film. While automatic film threaders are known, difficulty has been experienced in causing the film to advance through the film gate, that is between the film pressure plate and the film holder or rail, and between the sound drum and the sound pressure roller, when using prior art film threaders.

It is an object of this invention to provide an improved film threading device for a film scanning apparatus.

In accordance with one embodiment of the invention, a film threading device is provided including film guiding portions and at least one cam extending from said device. An apparatus that scans film to reproduce either pictures or sounds, or both, recorded on the film is provided, the apparatus including a cam follower arranged to cooperate with the cam to enlarge a space between elements of the apparatus through which the film must go during the threading of the film through the apparatus. The film threading device includes a locating element and the film scanning apparatus includes means cooperating with the locating element to hold the film threading device in a plurality of positions. In one position of the locating element with respect to the cooperating means, the cam cooperates with the cam follower to enlarge the space through which the film must go, and the film guiding portions of the device are in a position to guide the film towards that space. In another position of the locating element with respect to the cooperating means, the film threading device is held out of contact with the film or with any moving part of the film scanning apparatus, the film threading device being held in an inoperative of storing position for later threading of the apparatus.

In another embodiment, the film threading device may include not only film guiding portions but also a plurality of cam means and a plurality of locating elements extending from the device for cooperation with a sound projector having a plurality of cam followers. One cam follower cooperates with one of the cams to separate one end of the film pressure plate from the film rail or holder comprising a part of the film gate of a projector and another cam follower cooperates with another of the cams to separate the sound pressure roller from the sound drum of the projector. The projector may also be provided with means to cooperate with the locating elements. Again the film threading device may be located on the projector in one of two positions. At one position, the cams cause separation of the film pressure plate from the film holder or rail, and also cause separation of the sound pressure roller from the sound drum. In this one position of the device, the film guiding portions thereof guide the film through the projector. In the other position of the film guiding device, the film guiding portions thereof and the cam portions thereof have no effect on the flow of the film through the projector or on the parts thereof whereby in the other position of the film threading device it is in a self-storing position.

The invention will be more fully understood upon reading the following description in conjunction with the following drawings in which FIGURE 1 is a partial side elevational view of a sound projector adapted to cooperate with the film guiding device of this invention, FIGURE 2 is a side elevational view of a film guiding device of this invention showing the film guiding and cam portions thereof, FIGURE 3 is a partial sectional view of the film guiding device of FIGURE 2 on line 3—3 thereof, FIGURE 4 is a sectional view of the film guiding device of FIGURE 2 on line 4—4 thereof, FIGURE 5 is a side elevational view of the projector with the film guiding device mounted thereon, and FIGURE 6 is a fragmentary front elevational view of the projector with the film guiding device mounted thereon, parts of the projector being broken away.

A sound projector adapted to cooperate with the film guiding device is shown in FIGURE 1. In FIGURE 1, a support plate 10 is provided. An upper sprocket wheel 12 is mounted for rotation about its axis 14 in a clockwise direction (as viewed in FIGURE 1) by a driving means (not shown) mounted on the other or back side of the plate 10. A film shelf 16 is provided near the upper sprocket wheel 12. The shelf 16 has a cut away portion 18 more or less conforming in shape to the sprocket wheel 12 and spaced therefrom for a purpose to be described. A film shoe 20 is provided to cooperate with the sprocket wheel 12. As is known, the shoe 20 has an inner portion 22 conforming in shape to the circumference of the sprocket wheel 12 and a lip 24 overlying a portion of the sprocket wheel 12. The shoe 20 is spring pressed towards the sprocket wheel 12 and holds the film 26 that passes between the sprocket wheel 12 and the shoe 20 in a position to be driven by the sprockets 28 of the wheel 12. A light source casing, which may be a casting 30, of the projector is also mounted on the plate 10. A light tube 32 is fixed to the side of the casting that extends to the right (as viewed in FIGURE 1) and a lens system 34 is adjustably mounted in the tube 32. The plate 10 is indented in a conical manner indicated at 36 to permit expansion of the light rays provided by the described projector.

A film holder or rail 38 is mounted on the casting 30 between it and the tube 32. As is known, the rail 38 is flat and has raised side edges extending perpendicularly thereto running along opposite edges thereof to form a groove to receive the film 26 and also to receive a film pressure plate 40. The film rail 38 and the plate 40 each have a hole or gate thereon in line with the tube 32 to permit the propagation of light rays through the film held between the rail 38 and the plate 40. The rail 38 also has a slot (not shown) therein for the film advancing claw (not shown) to engage the sprocket holes in the film 26, to advance the film intermittently through the film gate. The film pressure plate 40 has an upper curved end and a lower curved end, the ends thereof curving away from the rail 38. The film pressure plate 40 is pressed towards the rail 38 and between the raised side edges thereof by a mechanism including a pin 42 pivotally attached to the plate 40. The pin 42 extends through a housing 44 mounted on the plate 10 and a cam follower button 46 is mounted at the end of the pin 42 that extends beyond the housing 44 in a direction away from the casting 30. A washer 48 is fixedly mounted on the pin 42 within the housing 44 and a compression spring 50 surrounds the pin 42 within the housing 44 and therefore urges the pin 42 to the left, which has the effect of urging the plate 40 into the groove in the rail 38 to hold the film 26, when it is threaded between the plate 40 and the rail 38, firmly in the film gate. The lower end of the plate 40 is urged into the groove in the rail 38 by a mechanism 52 like the mechanism comprising the elements 42, 48 and 50 except that the lower pin 54 comprising part of the mechanism 52 does not extend out of its associated housing towards the right, whereby no cam follower button such as the button 46 is provided for the mechanism 52. By grasping the button 46 and pulling to the right, the plate 40 may be rocked about its lower end to the position shown in dotted lines, whereby the space between the rail 38 and the plate 40 takes a triangular shape, the base of the triangle being at the top. In this position of the plate 40, the film 26 may easily be thrust into the film gate between the plate 40 and the rail 38.

No further explanation or showing of the rail 38 and the plate 40 and of the mechanism for urging the plate into the groove of the rail 38 or of the other elements of the film gate appears necessary, since except for the provision of the cam follower button 46, these elements are known.

An intermediate film support roller 56 is mounted on the plate 10 in a position beneath the tube 32. A sound drum 58 is mounted for rotation on the plate 10 to the right of the roller 56. A sound pressure roller 60 is mounted for rotation on an arm 62, this arm being pivoted at 64 on the plate 10. Spring means (not shown) urges the arm counterclockwise to cause the roller 60 to press the film 26 against the sound drum 58. The arm 62 has a cam follower portion 66 extending downward and over the upper portion of the sound drum 58 for a purpose to be described. The arm 62 has an extension 68 extending to the right of the pivot 64 beyond the edge of the plate 10. By manipulation of the extension 68, the arm 62 may be moved clockwise to the position shown in dotted lines whereby the roller 60 is spaced from the sound drum 58 to expedite threading of the film 56 between the roller 60 and the sound drum 58. As will be explained, upward pressure on the lower edge of the cam follower 66 of the arm 62 will also move the roller 60 away from the drum 58. A film guide 70 is provided partially surrounding the drum 58 to guide the film 26 around the drum and to the left. As understood, light (not indicated) shines through an overhanging portion of the film 26 that is passing over the sound drum 58 and the light that has passed through the film energizes a light sensitive cell (not shown) in reproducing the sound recorded on the film. Or, if the sound is recorded magnetically on the film, a magnetic reproducing head (not shown) positioned behind the drum 58 contacts the film and reproduces the sound recorded thereon.

A lower film supporting roller 72 is rotatably mounted on the plate 10 below the roller 56 and a lower drive sprocket wheel 74 and its shoe 76 are mounted to the left of the roller 72. Since the sprocket wheel 74 and its shoe 76 resemble the sprocket wheel 12 and its shoe 20, no further explanation of these elements is given. A final film support roller 78 is mounted for rotation on the plate 10 under the casting 30.

Holes 80 and 82 are positioned in the casting 10 at convenient locations for a purpose to be described.

In manually threading the described projector with the film 26, the film gate is opened. An end portion of the film, or a leader attached to the film, is placed in the film gate and the film gate is closed. A further portion of the film before the film gate is formed into an upper loop. Film is then inserted between the upper sprocket wheel 12 and its shoe 20. A portion of the film beyond the film gate is then formed into a lower loop and placed over the roller 56 and between the sound pressure roller 60 and the sound drum 58. A further portion is then placed over the roller 72 and between the lower sprocket 74 and its shoe 76 and the end of the film is led over the roller 78 to a take up reel, not shown. As can be seen, manual threading of the projector takes time and skill and may result in damaged film. Means to be described are provided to move the plate 40 and the arm 62 to their respective dotted position and to guide the film in its described path from the sprocket wheel 12 towards the support roller 78, with a minimum of handling of the film.

The rear view of a film threading device of this invention is shown in FIGURE 2. This film threading device is also shown in a front view and mounted on the projector in FIGURE 5 and in side view and also mounted on the projector in FIGURE 6 but on a smaller scale. Turning first to FIGURE 2, the film threading device includes an upper portion 84 and a lower portion 86 which are joined by a handle 88. The upper portion 84 comprises a plate 90 of a material having an irregular outline as shown. Except that the plate 90 fits between the sprocket wheel 12 and the rail 38 as shown in FIGURE 5, and does not interfere with the running of the described projector, the shape of the plate 90 is adaptable. A film guide portion 92 extends perpendicularly to the plate 90 from the upper edge thereof and a second film guide portion 94 extends part way across the plate 90 and runs parallel to the portion 92. The portions 92 and 94 are positioned and curved to guide the film 26 from the sprocket wheel 12 towards the rail 38 and above the pressure plate 40. The depth of the film guide portions 92 and 94 in a direction away from the plate 90 is a little greater than the width of the film 26. A stop 96, which, as shown, may be tapered away from the plate 90, extends from the plate 90 a distance a little greater than the depth of the film guide portions 92 and 94. A locating pin 98 extends from the plate 90. The pin 98 is shown as broken off in FIGURE 3, but it is shown in full length in FIGURE 6. As shown in FIGURE 6, a pair of circumferential grooves 100 and 102 are positioned along the length of the pin 98. Each groove is formed with a side 104 that extends perpendicularly to the pin and with a side 106 which increases gradually in diameter to the outer diameter of the pin 98 in a direction away from the plate 90.

Referring again to FIGURE 2, a cam 108 extends for a short distance from the plate 90. The cam 108 has a notch 110 therein to receive the pin 42 (FIGURE 1) and is shaped to fit into the space between the housing 44 and the cam follower button 46. The cam is also so shaped that when the cam 108 is forced into the space between the housing 44 and the cam follower button 46, it moves the button towards its dotted position (shown in FIGURE 1) whereby the pressure plate 40 is also moved towards its dotted position. As shown in FIGURES 3 and 6, the film guide portions 92 and 94, the stop 96, the pin 98 and the cam 108 all extend from the same side of the plate 90 and away from the handle 88.

The lower portion 86 includes a plate 114. The shape of the plate 114 is not critical, except that it fits (as shown in FIGURE 5) between the rail 38 and the film guide 70 without interfering with the operation of the described projector. A film guiding portion 112 runs along the plate 114 and extends perpendicularly to the plate 114. Another film guiding portion 116 runs along the plate 114 but below (as viewed in FIGURE 2) the portion 112 and more or less parallel thereto. A lip 118 extends from the plate 114 to catch and guide the film 26 when it leaves the film gate, as shown in FIGURE 5, to guide the film (to the left as viewed in FIGURE 2 and to the right as viewed in FIGURE 5) towards the space between the sound pressure roller 60 and the sound drum 58. A hole 120 may be provided through the plate 114 and along portion 116 through which the support roller 56 will be visible. Another pair of film guide portions 122 and 124 extend perpendicularly from the lower left hand portion of the plate 114. A lip 126 comprising an end portion of the guide portion 124 extends beyond the end of the plate 114 to the left as viewed in FIGURE 2. The portions 122 and 124 and the lip 126 act to guide the film 26 from the sound drum 58 over the roller 72 and down towards the bottom of the lower sprocket wheel 74. The lower end of the plate 114 is scalloped as shown at 121 to clear the roller 72.

The lower portion 86 of the film threading device also includes a locating pin 130 which is formed like the pin 98. The pin 130 extends from the center of a tapered boss 132 which itself extends perpendicularly to the plate 114. The boss 132 may comprise a thickened portion of the film guide portion 116, as shown. The boss 132 is a little longer in a direction perpendicular to the plate 114 than the guiding portions 112, 116, 122 and 124, and is equal in length to the stop 96, and acts as a spacer for the lower portion 86 as will be explained. The plates 90 and 114 which are joined by the handle 88 are substantially in the same plane. The parts 112, 116, 118, 122, 124, 126, 130 and 132 all extend in the same direction from the plate 114 and also in a direction away from the handle 88.

The upper left hand portion (as viewed in FIGURE 2), of the plate 114 is formed into a cam 134 by being offset therefrom in a direction opposite to the direction of the extension of the parts 112, 116, 122, 124, 126, 130 and 132 from the plate 114. This cam 134 is also shown in FIGURES 4 and 6. The cam portion 134 is joined to the plate portion 114 by the tapered portions 136 and 138. The end 140 of the cam portion is slantingly cut off to provide a cam bearing portion that will cooperate with the cam follower portion 66 of the arm 62 (FIGURES 1 and 5) to rotate the arm 62 clockwise and therefore to separate the sound pressure roller 60 from the sound drum 58 as will be more fully explained.

When the film threader device is mounted on the sound motion picture projector, the locating pin 98 is positioned to register with the cooperating locating hole 82 (FIGURES 1, 5 and 6) and the locating pin 130 is positioned to register with the locating hole 80. The film threading device is then moved inwardly, that is towards the plate 10. When the device is moved all the way in, that is until the stop 96 and the boss 132 contact the support plate 10, the ends of the springs 142 (FIGURE 6), which act as detents, contact the circumferential grooves 100 in the respective pins. The springs 142 are fixed to bosses 144 which extend from the back side of the support plate 10. The detent ends of the springs 142 are shaped to conform with the grooves 100 and 102 in the pins 98 and 130. Therefore, the film threading device is held in its fully in position as shown in FIGURE 6 when the detent end of the springs 142 cooperate with the grooves 100 or in its fully out or self-storing position (not shown) when the detent ends of the springs 142 cooperate with the grooves 102.

In the fully out position, the film threading device is in its storage position, that is, no part of the film threading device touches any part of the film 26 or any part of the film projector, except that the pins 98 and 130 are in the holes 82 and 80 and that the ends of the springs 142 are in the grooves 102 of the pins 98 and 130. By pushing in on the handle 88, that is by pushing the handle 88 in a direction towards the plate 10, the film threading device may be moved to its in or operative position as stated above. In this in or operative position, the cam 108 moves the cam follower button 46 to the right, as viewed in FIGURE 1, to space the upper end of the pressure plate 40 from the upper end of the film rail 38, and the cam face 140 contacts the cam follower 66 to rotate the arm 62 clockwise to separate the sound pressure roller 60 from the sound drum 58. At this position of the film threading device, having energized the projector to cause rotation of the sprocket wheels 12 and 74 and of the film gate claw (not shown), when the film 28 is moved in along the film shelf 16, the sprocket holes in the film 26 or of the film leader will engage themselves with the sprockets 28 extending from the sprocket wheel 12 and the film or leader will be guided by the film guiding portions of the film threader into the space between the rail 38 and the plate 40 and into the space between the sound drum 58 and its roller 60 and between the lower sprocket 74 and its shoe 76 until the end of the film or the film leader appears about the roller 78. At this time, the film threading device may be moved to its out or storage position. The film leader may then be engaged with a take up reel (not shown) and the threading of the projector is completed without touching any part of the film except the end thereof, or the end of the leader, and without touching any part of the projector over, around or through which the film must be threaded.

While the film threader has been described in connection with a sound motion picture projector, it will be understood that the film threader is adapted to cooperate with any film scanning device in which a film must move during the threading of the apparatus between two normally closely positioned parts. The hereinabove description is therefore to be considered as illustrative and not in a limiting sense.

What is claimed is:
1. A device for threading a record medium through an apparatus having a resiliently mounted pressure plate which is resiliently urged towards an element of a gate and a cam follower attached to said pressure plate for moving a portion of said pressure plate in a direction away from said gate, said device comprising
   a threading device comprising a unitary structure including guiding portions for guiding said medium towards said gate,
   said unitary structure also including cam means for cooperation with said cam follower for moving a portion of said pressure plate in a direction away from said gate to facilitate threading of said medium through said gate.
2. A device for threading a film between a sound drum and a resiliently mounted sound pressure roller which is resiliently urged towards said sound drum, the mounting for said roller comprising a cam follower for moving said mounting in a direction to separate said pressure roller from said sound drum, said device comprising
   a film threading device including a cam means cooperating with said cam follower to cause separation of said sound pressure roller and said sound drum, said film threading device also including film guiding portions for guiding said film towards the space between said roller and said drum.
3. A device for threading a film through a sound projector having a resiliently mounted film pressure plate which is resiliently urged towards an element of a film gate and a cam follower attached to said pressure plate for moving said pressure plate in a direction away from said film gate, said projector also having a sound drum and a resiliently mounted sound pressure roller which is resiliently urged towards said sound drum, the mounting for said roller comprising a cam follower for moving said sound pressure roller in a direction to separate said pres- sure roller from said sound drum, said device comprising a film threading device including film guiding portions for guiding said film towards said film gate, said film threading device further including cam means cooperating with said cam follower for moving said pressure plate in a direction away from said film gate to facilitate threading of said film through said film gate, said film threading device also including a cam means cooperating with said cam follower to cause separation of said sound pressure roller and said sound drum, said film threading device also including film guiding portions for guiding said film from said film gate towards the space between said roller and said drum.

4. A self-storing film threading device for a film scanning apparatus, said apparatus including a support plate having a locating hole therethrough and detent means mounted on said support plate and adapted to cooperate with a locating pin extending through said hole, said device including film guiding portions and a locating pin adapted to slide through said hole, said pin having a pair of circumferentially extending grooves spaced along the length thereof, said grooves being adapted to receive said detent to hold said device close to said plate in a film threading position when said detent extends into one of said grooves and to hold said device at a distance from said plate in a storage position when said detent extends into another of said grooves.

5. A device for threading a film through a picture projector, said projector including a support plate having a locating hole therethrough and detent means mounted on said support plate and adapted to cooperate with a locating pin extending through said hole, and having a resiliently mounted film pressure plate which is resiliently urged towards an element of a film gate and a cam follower attached to said pressure plate for moving a portion of said pressure plate in a direction away from said film gate, said device comprising film guiding portions for guiding said film towards said film gate, said film threading device also including cam means for cooperation with said cam follower for moving said pressure plate in a direction away from said film gate to facilitate threading of said film through said film gate, said device further including a locating pin adapted to slide through said locating hole, said pin having a pair of circumferentially extending grooves spaced along the length thereof, said grooves being adapted to receive said detent to hold said device close to said plate in a film threading position with said cam in contact with said cam follower when said detent extends into one of said grooves and to hold said device at a distance from said plate in a storage position when said detent extends into another of said grooves.

6. A device for threading a film between a sound drum rotatably mounted on a support plate and a sound pressure roller also mounted on said support plate and resiliently urged towards said sound drum, a cam follower being attached to said roller for moving said roller in a direction to separate said roller from said sound drum, said support plate having a locating hole therethrough and detent means mounted on said support plate and adapted to cooperate with a locating pin extending through said hole, said device comprising a cam means cooperating with said cam follower to cause separation of said sound pressure roller and said sound drum, said film threading device also including film guiding portions for guiding said film towards the space between said roller and said drum, said device including a locating pin adapted to slide through said hole, said pin having a pair of circumferentially extending grooves spaced along the length thereof, said grooves being adapted to receive said detent to hold said device close to said plate in a film threading position with said cam in contact with said cam follower when said detent extends into one of said grooves and to hold said device at a distance from said plate in a storage position when said detent extends into another of said grooves.

7. A device for threading a film through a sound projector having a resiliently mounted film pressure plate which is resiliently urged towards an element of a film gate and a first cam follower attached to said pressure plate for moving said pressure plate in a direction away from said film gate, said projector also having a sound drum and a resiliently mounted sound pressure roller which is resiliently urged towards said sound drum, and a second cam follower fixed to said sound pressure roller for moving said sound pressure roller in a direction to separate said pressure roller from said sound drum, said sound projector also including a support plate having a locating hole therethrough and detent means mounted on said support plate and adapted to cooperate with a locating pin extending through said hole, said device comprising film guiding portions for guiding said film towards said film gate, said film threading device including a first cam means cooperating with said first cam follower for moving said pressure plate in a direction away from said film gate to facilitate said threading of said film through said film gate, said film threading device also including a second cam means cooperating with said second cam follower to cause separation of said sound pressure roller and said sound drum, said film threading device including film guiding portions for guiding said film from said film gate towards the space between said roller and said drum, and said device including a locating pin adapted to slide through said hole, said locating pin having a pair of circumferentially extending grooves spaced along the length thereof, said grooves being adapted to receive said detent to hold said device close to said plate in a film threading position with said first and second cams in contact respectively with said first and second cam followers when said detent extends into one of said grooves and to hold said device at a distance from said plate in a storage position when said detent extends into another of said grooves.

8. A film threading device including a plate, film guiding portions extending along and perpendicularly from one side of said plate, a locating pin extending perpendicularly to said plate from said one side thereof, said pin having circumferentially extending grooves spaced therealong, and a cam portion also extending from said plate in a direction away therefrom.

9. A film threading portion in accordance with claim 8 comprising a second plate, film guiding portions extending along and perpendicularly from one side of said second plate, a locating pin extending perpendicularly to said second plate from said one side thereof, said pin having circumferentially arranged grooves spaced therealong, a cam portion also extending from said second plate, and a handle joining said first and said second plate and holding said plates in an inplane position.

10. A film threading portion in accordance with claim 8 comprising a second plate, film guiding portions extending along and perpendicularly from one side of said second plate, a pin extending perpendicularly to said second plate from said one side thereof,
said pin having circumferentially arranged grooves spaced therealong,
a cam portion extending from said second plate, and
a handle joining said first and said second plate and holding said plates in an inplane position,
said first cam extending from said first plate in the direction of extension of said first pin and said second cam extending from said second plate in the direction opposite to the direction of the extension of said first pin.

References Cited

UNITED STATES PATENTS 2,420,587   5/1947   Dietrich _____ 226—91 X

ALLEN N. KNOWLES, *Primary Examiner.*